A. T. DAWSON & G. T. BUCKHAM.
BREECH MECHANISM OF ORDNANCE.
APPLICATION FILED MAY 27, 1907.

905,997.

Patented Dec. 8, 1908.
8 SHEETS—SHEET 3.

A. T. DAWSON & G. T. BUCKHAM.
BREECH MECHANISM OF ORDNANCE.
APPLICATION FILED MAY 27, 1907.

905,997.

Patented Dec. 8, 1908.
8 SHEETS—SHEET 5.

A. T. DAWSON & G. T. BUCKHAM.
BREECH MECHANISM OF ORDNANCE.
APPLICATION FILED MAY 27, 1907.

905,997.

Patented Dec. 8, 1908.
8 SHEETS—SHEET 6.

A. T. DAWSON & G. T. BUCKHAM.
BREECH MECHANISM OF ORDNANCE.
APPLICATION FILED MAY 27, 1907.

905,997.

Patented Dec. 8, 1908.
8 SHEETS—SHEET 7.

UNITED STATES PATENT OFFICE.

ARTHUR TREVOR DAWSON AND GEORGE THOMAS BUCKHAM, OF WESTMINSTER, LONDON, ENGLAND, ASSIGNORS TO VICKERS SONS & MAXIM LIMITED, OF LONDON, ENGLAND.

BREECH MECHANISM OF ORDNANCE.

No. 905,997.     Specification of Letters Patent.     Patented Dec. 8, 1908.

Application filed May 27, 1907. Serial No. 375,879.

*To all whom it may concern:*

Be it known that we, ARTHUR TREVOR DAWSON, lieutenant, Royal Navy, director and superintendent of ordnance works, and GEORGE THOMAS BUCKHAM, engineer, both subjects of the King of Great Britain, residing at 32 Victoria street, Westminster, in the county of London, England, have invented certain new and useful Improvements Relating to the Breech Mechanism of Ordnance, of which the following is a specification.

This invention relates to breech mechanism of the complete withdrawal type or class, combining the advantages of the parallel obturator pad and the short swinging centers peculiar to that form of mechanism. The species of this class of mechanism to which our invention particularly relates comprises a cylindrical breech screw rotatably mounted in a swinging carrier ring having platforms for supporting the breech screw when it has been withdrawn from the breech by a rectilinear movement in the carrier ring after said screw has been angularly displaced to unlock it from the breech by means of crank mechanism; the angular displacement and rectilinear movement of the breech screw and the swinging of the carrier ring taking place in proper sequence by the continued movement of the breech actuating hand wheel.

An important feature of our invention is the arrangement of the breech-screw withdrawing gear beneath the said screw, whereby increased efficiency is obtained during the withdrawal, and as the dead weight of the moving mass gravitates towards the withdrawing gear, the withdrawal is effected with but slight tendency of the screw to lateral displacement.

Another important feature is the withdrawing gear comprising a rack which is made in two parts, one part being in a nonrotary cover plate of the breech screw and the other in the breech screw with which it rotates. The pinion for actuating this rack has two active surfaces one of which is arranged to engage with the part of the rack in the cover plate during the angular displacement of the breech screw and the other arranged to engage with the part of the rack in the breech screw as the latter assumes a position to bring this part of the rack into the plane of the rack pinion. The surface of the said rack pinion that first comes into action is a slow cam surface engaging with a roller on the cover plate, and acting powerfully to unseat the obturator pad. This action is immediately followed by that due to a specially formed part or toothed surface so arranged as to lead by easy sequence to the ordinary teeth on the pinion which constitute the other active surface and engage with the rack in the breech-screw. This active surface of the rack-pinion is of a larger radius than the other surface, and will therefore rapidly move the breech screw during the final stage of its withdrawal.

For angularly displacing the breech screw, the carrier ring is provided with a lever plate with which suitable interrupted collars on the breech screw engage so that the screw will move angularly with said lever plate when the latter is actuated and will also slide longitudinally therein by the action of the withdrawal gear.

In a laterally extended arm of the lever plate is the cam groove for the engagement of a roller projecting from a pinion arm or crank, the teeth of which engage with a segment of similar teeth on a pinion on the axis pin of the carrier ring. These pinions are so arranged that at the beginning of the movement the engaging teeth are of ordinary form, but, when the breech screw is nearly unlocked, teeth of special form come into action, so that when the angular movement of the breech screw has been completed the axis-pin pinion locks the said pinion arm during the remaining movement of the mechanism.

The axis pin of the swinging carrier ring is adapted to be actuated either by hand or by power, for which purpose we provide suitably arranged clutch gear which is controlled by a screwed nut that is capable of actuation by a hand wheel or the like forming part of a rod extending through the axis pin, so that the bringing into action of the hand gear or the power gear is effected by longitudinally shifting this rod relatively to the axis pin in one or other direction. This hand wheel is furnished at its rim with a catch which operates to retain said hand wheel in either the "power" or the "hand" position, the said catch being so arranged that it can be conveniently released by the hand of the operator when he grasps the rim of the hand wheel to turn it. The handle of the hand-wheel used for actuating the breech mechanism is of sufficient length to allow the mechanism to be worked by two men and is capable of being pushed lengthwise through a boss on the handwheel so as to lie out of the way, when not in use.

In order that our said invention may be clearly understood and readily carried into effect we will describe the same more fully with reference to the accompanying drawings in which:—

Fig. 4$^a$ is a similar view but shows the position of the parts just before the outward swinging movement of the carrier ring takes place and after the breech screw has been fully withdrawn. Fig. 7 is a horizontal section taken approximately on the line 4, 4 of Fig. 5. Fig. 7$^a$ is a longitudinal section taken through the handle of the breech actuating hand wheel. Fig. 8 is a detail sectional view showing the pinion arm and lever plate for angularly displacing the breech screw.

A is the breech end of the gun.

B is the breech screw and B' is its cover plate.

C is the swinging carrier ring having platform C' C' for the breech screw when it is withdrawn.

D is the lever plate for angularly displacing the breech screw and E is the axis pin for the swinging carrier ring.

Figure 1:
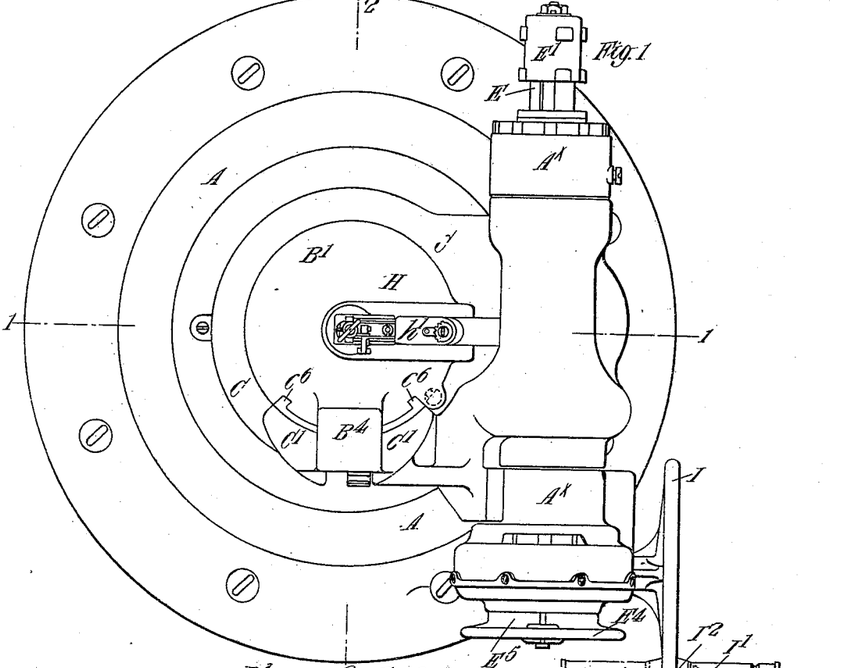
Figure 1 is an end elevation of the improved breech mechanism.
Figure 2:
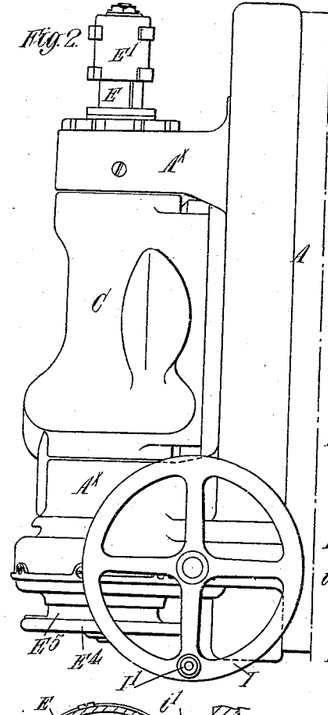
Fig. 2 is a side elevation of the same as seen from the right of Fig. 1.
Figure 3:
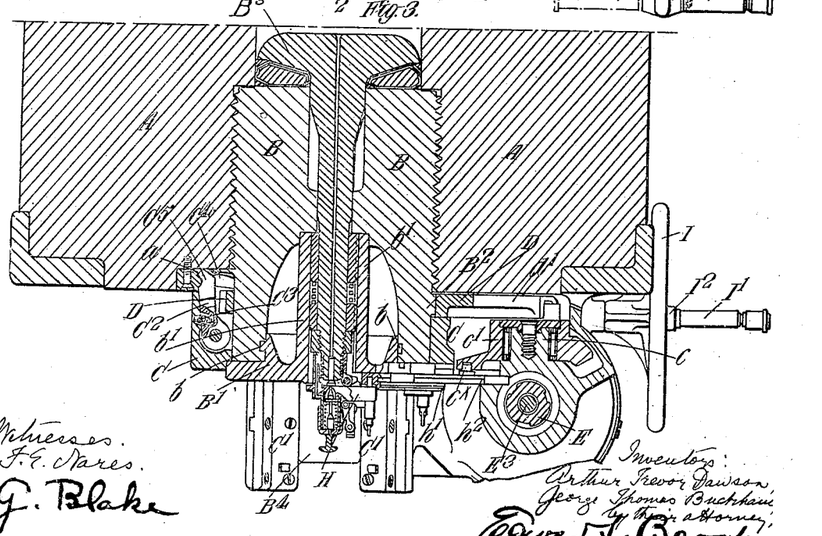
Fig. 3 is a horizontal section taken approximately on the line 1, 1 of Fig. 1.
Figure 4:
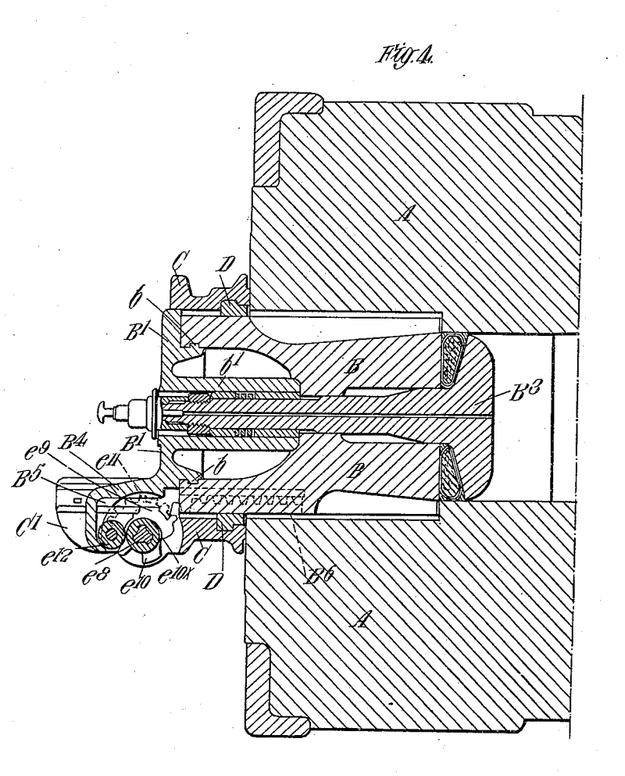
Fig. 4 is a vertical section taken approximately on the line 2, 2 of Fig. 1.
Figure 4A:
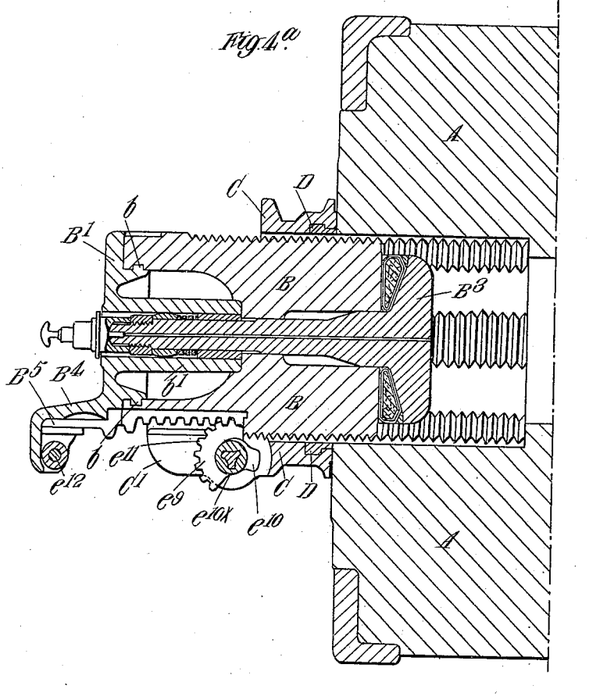
Figures 10, 11, 12:
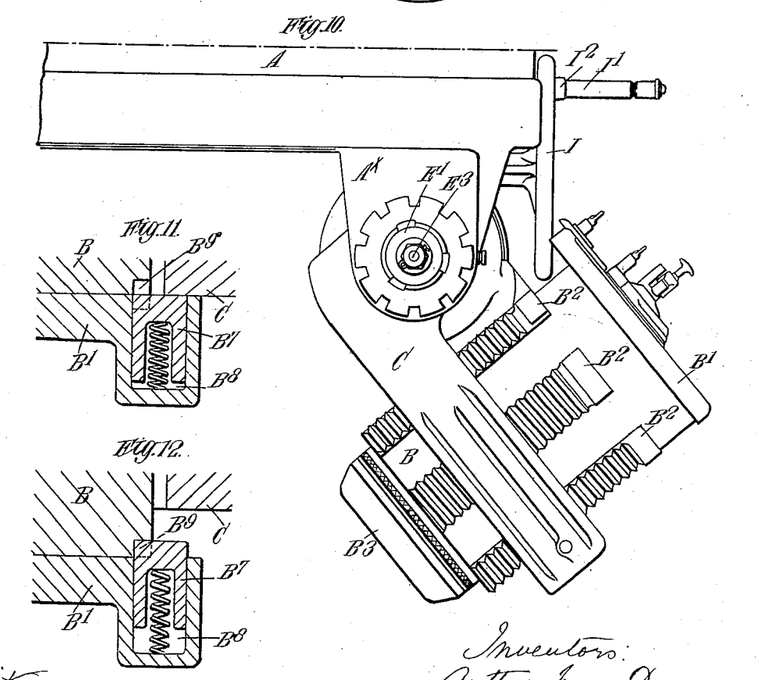
Figs. 11 and 12 are sections of the device for preventing rotation of the cover-plate when the carrier ring is swung outward to open the breech.

The breech screw B is cylindrical with an interrupted thread, preferably in six divisions, cut around its circumference. The interrupted threads terminate at the breech face of the gun in a broad interrupted collar B$^2$. The remaining portion of the breech screw is a plain cylinder of a diameter equal to the diameter of the part at the bottom of the threads, and is adapted to pass through the carrier ring C. The cover-plate B' is arranged to engage with the breech screw by interrupted collars $b$ $b$ (Figs. 3 and 4) and a central spigot $b'$ which receives the stem of the obturator B$^3$. The said cover-plate B' is not rotatable with the screw, being held by the casing B$^4$ that incloses the rear portion of the withdrawing rack and that engages with the projecting platforms C' on the carrier. When the carrier ring is swung outward to open the breech, and the rack casing B$^4$ of the cover plate B' disengaged from the platforms C', the rotation of the said cover-plate is prevented by a hinged spring-controlled stop-pin or spring plunger B$^7$ arranged in a recess B$^8$ in said cover-plate B$^1$. Part of the face of the plunger rests on the surface of the carrier C as shown in Fig. 11, so that when the breech screw B and cover-plate B$^1$ begin to move outward during the withdrawing movement, and leave the face of the carrier C, the plunger B$^7$ is pushed forward by its spring and enters a pocket B$^9$ in the rear face of the breech screw as shown in Fig. 12. This secures the breech screw B and coverplate B$^1$ together until the breech screw is again inserted into the breech when the plunger or catch B$^7$ is pressed out of the pocket B$^9$ by its contact with the surface of the carrier C.

Engaging with the interrupted collar B$^2$ at the rear of the breech screw threads, is the lever plate D which is held in position in the carrier ring by interrupted collars; the breech screw being free to move through the said lever plate when said screw is actuated by the withdrawing gear.

Figure 5:
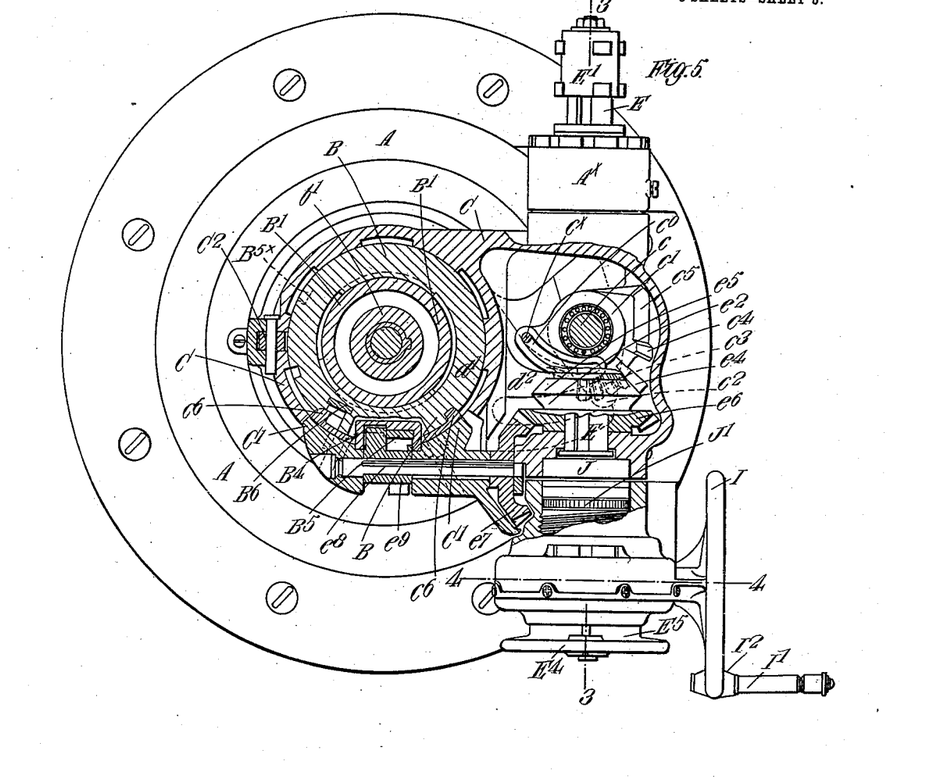
Fig. 5 is an end elevation like Fig. 1 but with some of the parts in section.
Figure 13:
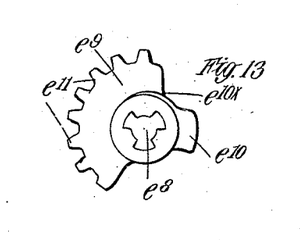
Fig. 13 is an enlarged view of the double rack pinion.

$d'$ is the laterally extended arm with which the lever plate is furnished, said arm being formed with the cam groove $d^2$. Carried by a spigot or stud $c$ projecting radially from the hinge of the carrier ring C is the pinion arm or crank $c'$ having the roller or crank pin $c^2$ that engages with the aforesaid cam groove $d^2$ of the lever plate. The bevel teeth $c^3$ of this pinion arm or crank are of the ordinary kind and mesh with similar bevel teeth $e^3$ (Fig. 6) forming part of a bevel pinion $e^2$ which is carried by the axis pin E. In addition to the ordinary bevel teeth $c^3$ the said pinion arm or crank has a tooth $c^4$ with which a corresponding tooth $e^4$ on the bevel pinion $e^2$ engages as the breech screw completes its angular movement in disengaging its threads from the breech threads, the action of said teeth $c^4$ $e^4$ being to cause the plain portions $c^5$ $e^5$ of the pinion arm or crank $c'$ and the bevel pinion $e^2$ respectively, to come into coincidence, so that the continued movement of the bevel pinion $e^2$ will not cause further motion to be imparted to the pinion arm or crank $c'$ and the lever plate D. By these means also the pinion $e^3$ operates to lock the pinion arm or crank $c'$ during the ensuing movement of the mechanism so that said pinion arm or crank will not again come into action until the breech screw is to be relocked to the breech threads in closing the breech. The underside of the pinion $e^2$ is formed with other bevel teeth $e^6$ gearing with a bevel pinion $e^7$ (Fig. 5) keyed to a spindle $e^8$ lying transversely beneath the rectilinear path of the breech screw and having a rack pinion $e^9$ for actuating the withdrawing rack of the breech screw. This withdrawing rack is in two parts $B^5$ $B^6$ as aforesaid, the part $B^5$ being on the interior of the rack casing $B^4$ of the cover plate and therefore not participating in the angular movement of the breech screw, and the other part $B^6$ being on the breech screw and participating in said angular movement. The rack-pinion $e^9$ has two active surfaces or sets of teeth $e^{10}$, $e^{11}$ (Fig. 4 and Fig. 13) one of which $e^{10}$ is arranged to engage with the part $B^5$ of the rack and the other $e^{11}$ with the part $B^6$ of the rack. The part $e^{10}$ is also formed with the aforesaid slow cam surface $e^{10\times}$ which, prior to the engagement of the part $e^{10}$ with the part $B^5$ of the rack, exerts a powerful rearward pull on the cover plate $B'$ through the roller $e^{12}$, this operation occurring after the breech screw has been angularly displaced to unlock it from the breech threads, and serving to unseat the obturator pad. This having been accomplished the part $e^{10}$ engages with the part $B^5$ of the rack and by actuating the latter commences to withdraw the breech screw, the completion of the withdrawal being effected by the teeth $e^{11}$ engaging with and operating the part $B^6$ of the rack which has previously been brought into a position for being thus acted upon, by the angular displacement of the breech screw during its unlocking movement. The parts then assume the position shown by Fig. 4ª.

The aforesaid platforms $C'$ are provided with rollers for reducing the friction during the withdrawal and the outer sides of the platforms have radial ridges or flanges $c^6$ which engage with slots in the cover plate $B'$ and also with the breech screw when the latter is withdrawn, thereby retaining it circumferentially and limiting its withdrawal.

The catch $C^2$ pivoted in a recess in the carrier is normally acted upon by the spring $C^3$ so that when a pocket $B^{5\times}$ in the breech screw arrives opposite a finger $C^4$ on said catch during the unlocking movement of the breech screw, the said finger $C^4$ will engage with the said pocket $B^{5\times}$ (Fig. 5), thus securing the breech screw to the carrier during the swinging movement. The catch $C^2$ is also provided with a nose $C^5$ which, prior to the unlocking and withdrawal of the breech screw, is held in engagement with the recess $a$ in the breech end of the gun, by the plain portion of the breech screw bearing against the finger $C^4$.

For actuating the firing lock frame H we may provide a link arrangement $h'$ similar to that already proposed by us in other kinds of breech mechanism but different in that an intermediate link $h^2$ (Fig. 3) connects it by means of a pin $c^\times$ with a groove $c^0$ in the pinion arm or crank $c'$. The link $h'$ carrying the lock is capable of ready disengagement from the intermediate link when required to extract a primer by hand. When the breech block is withdrawn the frame H and the link $h^1$ move therewith, while the intermediate link $h^2$ remains behind.

Figure 6:
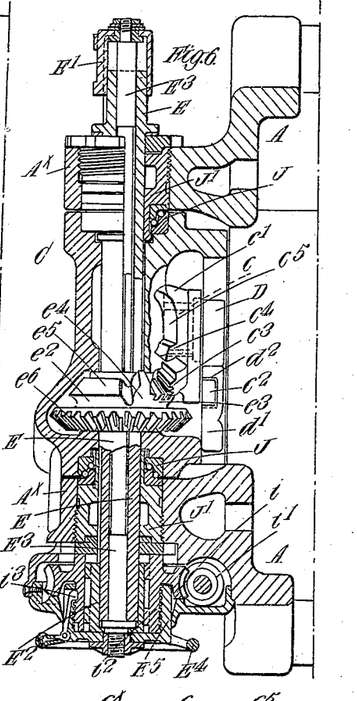
Fig. 6 is a vertical section taken approximately on the line 3, 3 of Fig. 5.
Figures 7, 7A, 8:
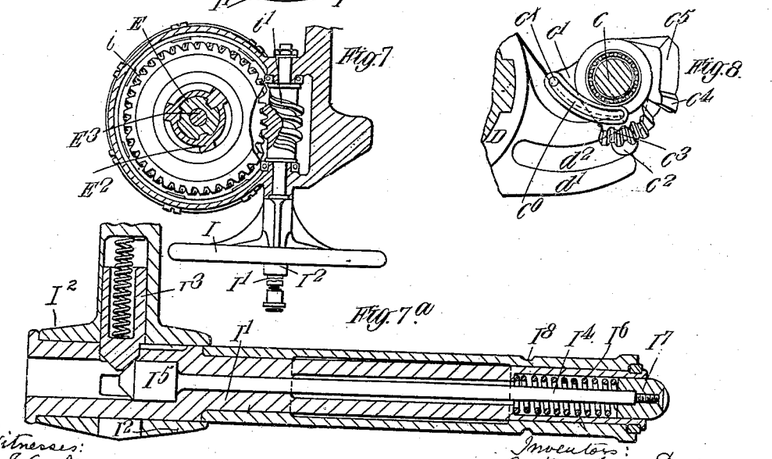
Figure 9:
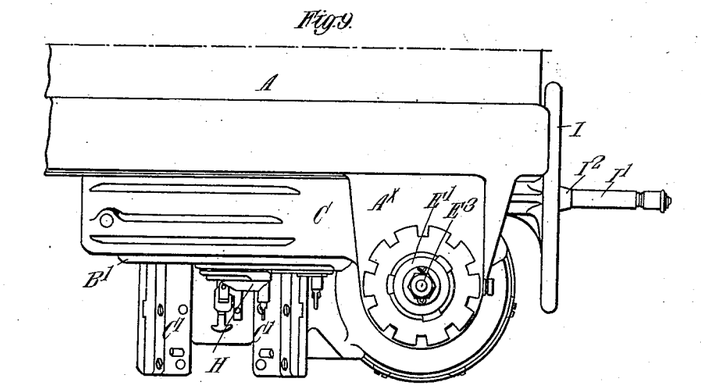
Figs. 9 and 10 are plans of the mechanism showing the swinging carrier ring respectively in the closed and the open position.
Figure 14:
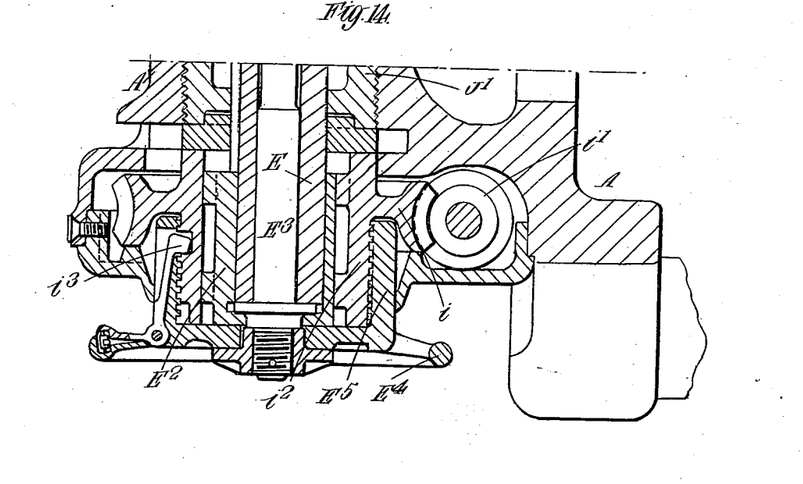
Figs. 14 and 15 are enlarged views of the two clutches for changing from hand drive to power drive, Fig. 15 showing the power pinion in position.
Figure 15:
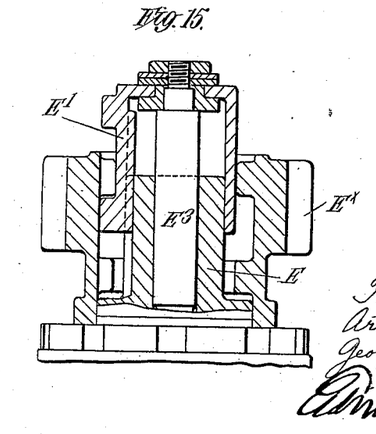
Figures 16, 17, 18:
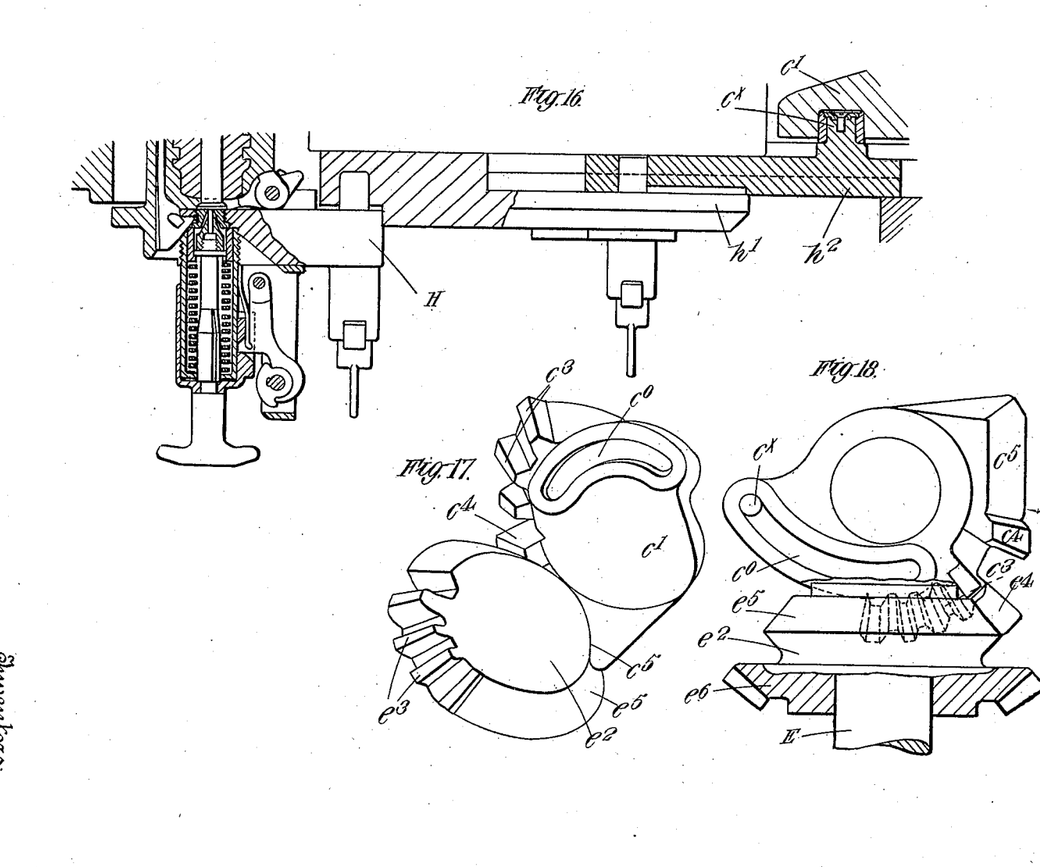
Fig. 16 is an enlarged view of the firing lock frame and connections.
Figs. 17 and 18 are views of the crank pinion in gear with the bevel pinion.
Figure 19:
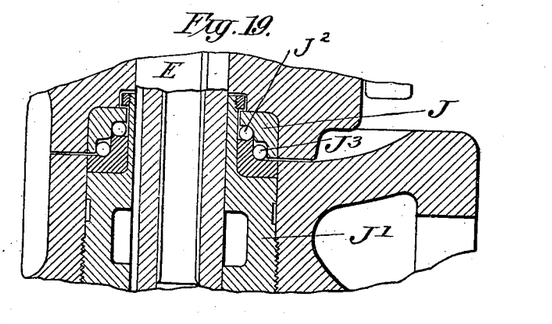
Fig. 19 is an enlarged view of the lower antifriction bearings for the hinge of the carrier ring.

As before stated the axis pin E of the carrier ring is adapted to be operated either by hand or by power. The hand gear comprises a worm wheel $i$ contained within a casing at the lower extremity of the axis pin and actuated by a hand-wheel I through the intervention of a worm $i'$ (Figs. 6 and 7). The power gear comprises a pinion $E^\times$ situated at the upper end of the axis pin and actuated by any suitable means. Clutches $E^1$ $E^2$ situated near the top and bottom of the axis pin are carried by the central rod $E^3$ which extends through the axis pin as aforesaid, so that instead of raising and lowering the axis pin for changing from the hand to the power gear, the said central rod is raised and lowered within the axis pin for bringing one or other of the clutches into its operative condition. To the lower end of the central rod is connected a clutch handwheel $E^4$ having a screw nut $E^5$ (Fig. 14) which engages by square threads with the boss $i^2$ of the worm wheel $i$, and as the latter is kept from vertical movement by the worm wheel casing, the said nut $E^5$ and hand wheel $E^4$ when rotated give the necessary vertical movement to the central rod and the clutches which are keyed to the axis pin. The upper clutch $E'$ engages with recesses in the boss of the pinion of the power gear and the lower clutch $E^2$ engages with recesses in the boss of the worm wheel $i$ Fig. 15. This clutch gear, in consequence of its lightness, will have the advantage of great facility of reversion, and by reason of the disposition of the keys will permit a satisfactory distribution of stress. Attached to the rim of the clutch handwheel $E^4$ is a positive catch $i^3$ (Fig. 14) which retains the handwheel in either the "power" or the "hand" position. This catch is as above stated so arranged that it can be conveniently released by the hand of the operator in grasping the rim of the hand wheel to turn the latter.

The upper and lower anti-friction bearings J J (Fig. 6) for the hinge of the carrier ring are identical and interchangeable. The bearing bushes $J'$ are screwed into the lugs $A^\times$ on the gun and are prevented from turning by suitable means. By this arrangement it is possible to remove the bearings intact without dismantling the carrier ring and breech screw. The anti-friction balls are arranged in two sets $J^2$ and $J^3$, one set $J^2$ taking up the weight of the mechanism, and the other $J^3$ the friction at the circumference of the axis pin. These bearings can be vertically adjusted for centering the carrier ring and breech screw, when the mechanism is assembled.

The breech actuating hand wheel I has a handle I' of sufficient length to enable the mechanism to be worked by two men, as aforesaid, and when out of use it can be pushed through the boss $I^2$ so as not to project unduly beyond the outer face of said hand wheel. In order to permit the handle to be thus shifted the boss is provided with a catch $I^3$ which operates to retain said handle when in its extended or operative position. This catch is released by a push rod $I^4$ placed in the handle. This rod has at one end a coned or tapered portion $I^5$ which engages with the catch, and at the other end has a spiral spring $I^6$ which is retained in position by a push button $I^7$ protruding beyond the outer end of the handle. When the button $I^7$ is pushed, the rod $I^4$ and tapered portion $I^5$ press the catch out of engagement with the handle, thereby allowing the latter to be pushed through the boss $I^2$, until the catch enters a circumferential groove $I^8$ near the outer end of the handle, by which it is automatically retained in the housed position from which it may be released and returned to the normal position by pushing it through the boss in the reverse direction.

What we claim and desire to secure by Letters Patent of the United States is:—

1. In gun breech mechanism of the kind in which the breech screw is capable of angular and rectilinear displacement in a swinging carrier ring; the combination with a lever plate or ring for imparting the angular movement to the breech screw without impeding its rectilinear movement, of an axis pin for the swinging carrier ring, a pinion arm or crank provided with two sets of teeth and mounted on the swinging carrier ring near its axis pin and a pinion on said axis pin also provided with two sets of teeth, one set operating to impart angular movement to the lever plate or ring and the other set operating to lock the pinion arm or crank during the remaining movement of the mechanism.

2. In gun breech mechanism of the kind in which the breech screw is capable of angular and rectilinear displacement in a swinging carrier ring; the combination with a lever plate or ring mounted on the carrier ring and adapted to impart angular movement to the breech screw without impeding its rectilinear movement, of a rack forming part of a non-rotary cover plate for the breech screw, a second rack forming part of the breech screw, an actuating pinion situated beneath the breech screw, two sets of teeth on said pinion for successively operating the two racks, a projection on the said cover plate, a cam piece on said pinion adapted to engage said projection, means for angularly displacing said lever plate or ring and means for operating said pinion, both of said means receiving their motion from the breech actuating mechanism.

3. In gun breech mechanism of the kind in which the breech screw is capable of angular and rectilinear displacement in a swinging carrier ring; the combination with the axis pin of the swinging carrier ring, of a rod adapted to slide longitudinally in said axis pin, clutches near opposite ends of said axis pin, and means whereby said rod can be actuated to cause the clutches to render the axis pin capable of operation by hand or by power.

4. In gun breech mechanism of the kind in which the breech screw is capable of angular and rectilinear displacement in a swinging carrier ring; the combination with the axis pin of the swinging carrier ring, of a rod adapted to slide longitudinally in said axis pin, clutches near opposite ends of said axis pin, hand actuated gear for rotating said axis pin, a screwed nut engaging with threads on a part of said hand actuating gear, a hand wheel integral with said screwed nut, and means for enabling said hand-wheel to be locked to or released from the said hand actuated gear.

5. In gun breech mechanism of the kind in which the breech screw is capable of angular and rectilinear displacement in a swinging carrier ring; the combination with the axis pin of the swinging carrier ring, of a rod adapted to slide longitudinally in said axis pin, clutches near opposite ends of said axis pin, hand actuated gear for rotating said axis pin, a screwed nut engaging with threads on a part of said hand actuated gear, a hand wheel integral with said screwed nut, a spring controlled catch device mounted on said hand wheel, and means whereby said catch device is capable of being placed in its disengaged position when the said hand wheel is grasped.

6. The combination with a breech actuating hand wheel, of a sliding handle carried by said hand wheel, a spring controlled retaining catch on the hand wheel normally tending to retain the said handle in its outward position, and means whereby said spring controlled catch can be liberated to permit said handle to be pushed into its inward or housed position.

7. The combination with a breech actuating hand wheel, of a sliding handle carried by said hand wheel, a retaining catch on the hand wheel normally tending to retain the said handle in its outward position, a spring controlled sliding rod within said handle, a push piece at the outer end of said sliding rod, and a tapered portion at the inner end of said sliding rod adapted to release the aforesaid catch device.

In testimony whereof we affix our signatures in presence of two witnesses.

ARTHUR TREVOR DAWSON.
GEORGE THOMAS BUCKHAM.

Witnesses:
  HENRY KING,
  E. E. LARKINS.